UNITED STATES PATENT OFFICE.

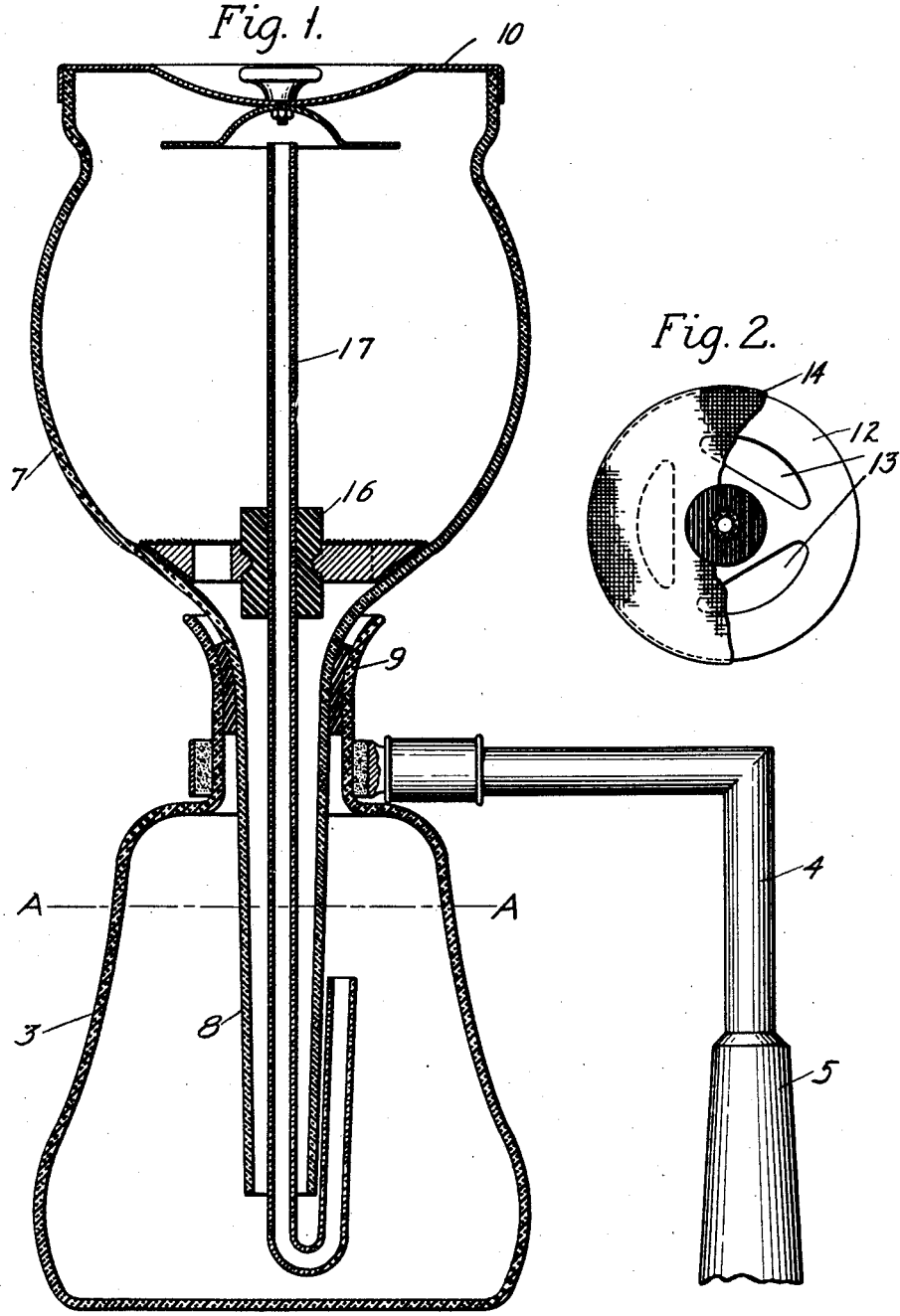

LEWIS S. BAKER, OF OSSINING, NEW YORK, ASSIGNOR TO WESTERN ELECTRIC COMPANY, INCORPORATED, OF NEW YORK, N. Y., A CORPORATION OF NEW YORK.

COFFEE PERCOLATOR.

1,406,814.  Specification of Letters Patent.  Patented Feb. 14, 1922.

Application filed January 4, 1921. Serial No. 434,919.

*To all whom it may concern:*

Be it known that I, LEWIS S. BAKER, a citizen of the United States of America, residing at Ossining, in the county of Westchester, State of New York, have invented certain new and useful Improvements in Coffee Percolators, of which the following is a full, clear, concise, and exact description.

This invention relates to coffee percolators, and particularly to percolators of the type characterized by a boiling vessel, a steeping vessel, a tube extending from the bottom of the steeping vessel into the boiling vessel, and a screen in the bottom of the steeping vessel upon which the coffee is supported. In such percolators, when the water in the boiling vessel is heated, the pressure of the steam which collects above it forces the major portion of the water upward through the tube and through the screen into the upper vessel where the coffee is steeped; and as long as heat is applied to the boiling vessel the liquid which has been forced up into the steeping vessel is held there by the pressure of the steam in the boiling vessel. In order to make the strongest coffee solution from the coffee used, it is necessary to let the liquid flow back from the steeping vessel into the boiling vessel and mix with the liquid retained in the latter, at least once and preferably several times. In order to permit the liquid to return to the boiling vessel, it has been necessary to remove the lamp or other source of heat for an instant to allow the steam pressure in the boiling vessel to decrease by the condensation of the steam therein; and after the return of the liquid has been effected, the lamp is replaced and the liquid is again forced up into the steeping vessel.

The object of the present invention is to provide means for automatically and repeatedly causing the major portion of the liquid to pass from the boiling vessel to the steeping vessel and to collect there and then to pass back to the boiling vessel, while heat is continually applied to the boiling vessel.

In the drawing, Fig. 1 is a side elevation, partly in section, of a percolator having the invention embodied therein; and Fig. 2 is a plan view of the coffee supporting member, a portion of the fabric covering the same, being broken away to show the part beneath.

Referring to the drawing, the boiling vessel 3 is removably supported in a standard 4 having a handle portion 5 and a base portion (not shown). The steeping vessel 7 is connected with the boiling vessel by a stem or tube 8 which extends from the bottom of the steeping vessel into the boiling vessel, through a sealed joint which may consist of a rubber shell 9 interposed between the tube 8 and the neck of the boiling vessel 3. The steeping vessel 7 is provided with a removable cover 10. All of the parts so far described may be of any suitable well known type.

Located in the bottom of the steeping vessel is a coffee supporting member or screen which may comprise a porcelain member 12 having openings 13 therethrough and having a beveled edge adapted to make flat contact with the inside of the bottom of the steeping vessel 7; and a piece of fabric 14 adapted to cover the upper surface of the member 12 and extend downwardly over the beveled edge thereof. In the center of the member 12, is a hole adapted to receive a rubber cork 16 having a hole therethrough. Passing through and making frictional engagement with the cork 16, is a tube 17 which extends from the upper part of the steeping vessel 7 downwardly through the cork 16 substantially parallel with and preferably through the tube 8 and then upwardly inside the boiling vessel 3 so as to communicate with the upper part of the latter. It will be obvious that, before the tube 8 of the steeping vessel 7 is inserted in the boiling vessel 3, the coffee supporting member with the cork 16 may be placed in the bottom of the steeping vessel 7, and that the tube 17 may be inserted in the bottom of the tube 8 and pushed through the hole in the rubber cork 16 until the parts have approximately the relative relations shown in the drawing. The steeping vessel 7, with the parts assembled with it including the rubber shell 9, may then be placed in completely assembled relation to the boiling vessel 3, as shown in the drawing.

In using the percolator, the boiling vessel 3 should be filled with water up to approximately the level indicated by the line A—A; pulverized coffee should be placed on the coffee supporting screen in the steeping vessel 7; the cover 10 should be put on; and heat should then be applied to the boiling vessel 3. It is important to note that the water level in the boiling vessel 3 should be considerably above the upwardly turned end of the tube 17, in order to insure that the bottom U-shaped end of this tube is filled. As the steam pressure increases in the top of the boiling vessel 3, the water therein will be forced upwardly through the tube 8 and through the coffee supporting screen and the coffee into the steeping vessel 7. The liquid trapped in the bottom of the tube 17 will also be gradually forced upwardly in this tube. The steam pressure thus supports two columns of liquid, one in the tube 8 and the other in the tube 17. The height of the water column in the tube 17 is fixed by the length of the short leg of the U-shaped end of said tube; and to balance any steam pressure in the boiling vessel 3 corresponding to any desired height to which it is desired that the water shall rise in the steeping vessel 7, it is only necessary to change the proportions of the legs of the U-shaped tube 17. The static head of the water column in tube 8 and the steeping vessel 7 is constantly increasing as the steam pressure increases, while that in the tube 17 is limited after the water level in the vessel 3 falls below the top of the short leg of the U-shaped tube 17; and, therefore, as soon as the steam pressure in the boiling vessel exceeds the static pressure of the water column in the tube 17, this water is blown out into the steeping vessel 7 and the tube 17 then acts as a vent for the boiling vessel, keeping the steam in that vessel at atmospheric pressure until the liquid in the steeping vessel has descended by gravity into the boiling vessel and has reached such a height as again to flow into the bottom of the tube 17. When the bottom of the tube 17 is thus filled again, the steam pressure within the boiling vessel 3 commences to increase, and the operation of the apparatus will be repeated and continued as long as heat is applied to the boiling vessel.

When the coffee has been steeped to the desired degree, the heat is removed, the liquid is allowed to return from the steeping to the boiling vessel, and the steeping vessel and the attached parts are removed. The coffee is then left in the boiling vessel ready for use.

What is claimed is:

1. A coffee percolator comprising a boiling vessel, a steeping vessel, a tube connecting the steeping vessel with the boiling vessel, and means for automatically causing the major portion of the liquid to pass from the boiling vessel to the steeping vessel and to collect there and then to pass back to the boiling vessel successively and repeatedly.

2. A coffee percolator comprising a boiling vessel, a steeping vessel located above the boiling vessel, a tube connecting the steeping vessel with the boiling vessel, and another tube extending from the upper part of the steeping vessel downwardly and then upwardly so as to communicate with the upper part of the boiling vessel.

3. A coffee percolator comprising a boiling vessel, a steeping vessel located above the boiling vessel, a tube connecting the steeping vessel with the boiling vessel, and another tube extending from the upper part of the steeping vessel downwardly and substantially parallel to the first named tube and then upwardly inside the boiling vessel.

4. A coffee percolator comprising a boiling vessel, a steeping vessel, a tube extending from the bottom of the steeping vessel and into the boiling vessel, and another tube extending from the upper part of the steeping vessel downwardly through the first named tube and then upwardly inside the boiling vessel.

5. A coffee percolator comprising a boiling vessel, a steeping vessel, a tube extending from the bottom of the steeping vessel and into the boiling vessel, a coffee supporting screen in the bottom of the steeping vessel, and another tube extending from the upper part of the steeping vessel downwardly through the coffee supporting screen and through the first-named tube and then upwardly inside the boiling vessel.

In witness whereof, I hereunto subscribe my name this 3rd day of Jan. A. D., 1921.

LEWIS S. BAKER.